United States Patent Office 3,386,700
Patented June 4, 1968

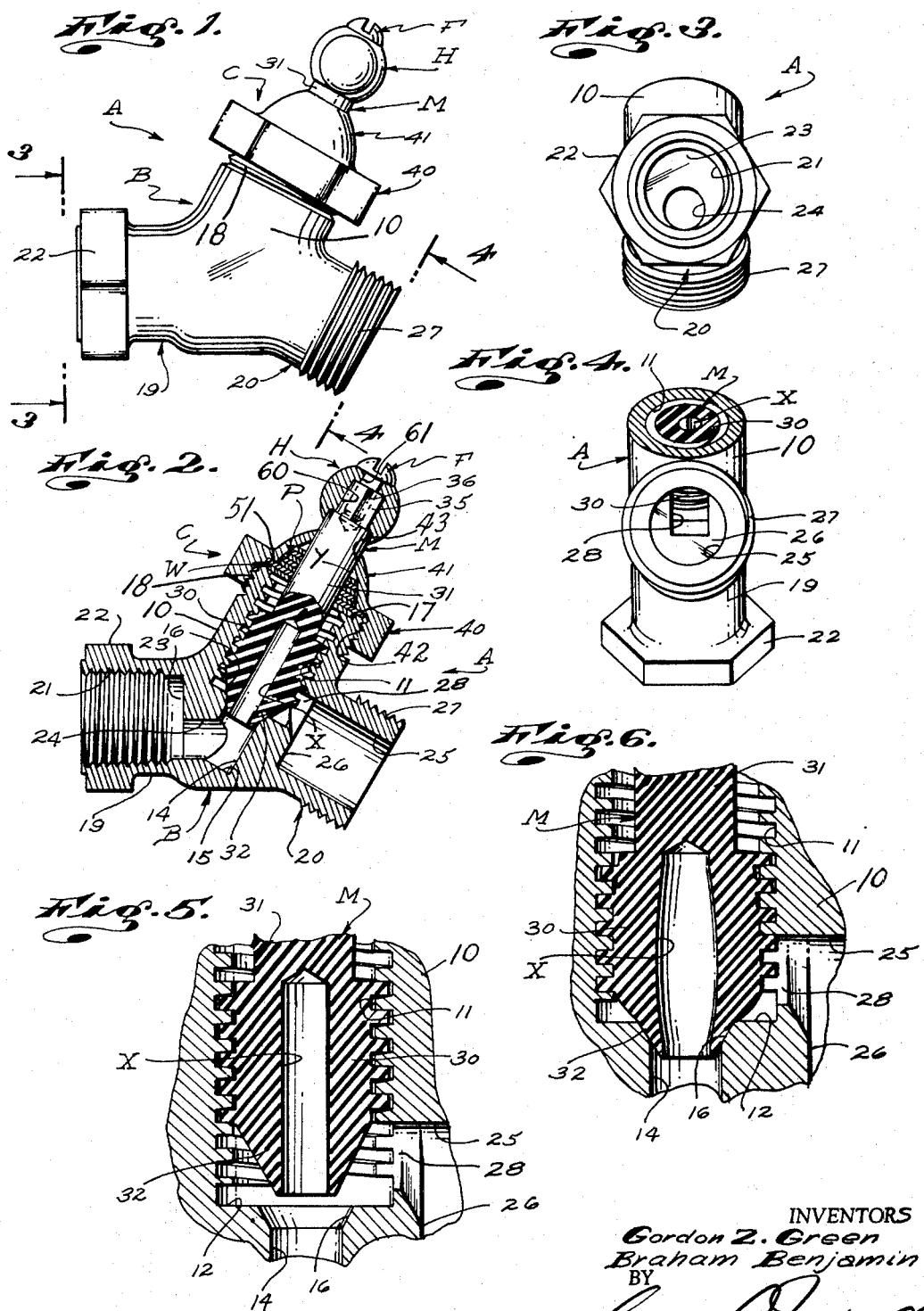

3,386,700
PRESSURE SEAL BIB
Gordon Z. Greene, Arcadia, and Braham Benjamin, Chatsworth, Calif. (both of 2119 N. Rosemead Blvd., South El Monte, Calif. 91733)
Filed Jan. 7, 1965, Ser. No. 424,079
5 Claims. (Cl. 251—175)

ABSTRACT OF THE DISCLOSURE

A pressure seal bib-type plug valve including, an elongate body with inner and outer ends, an elongate internally threaded valve chamber entering the outer end of the body and terminating at a bottom therein, a lateral inlet flow passage entering the body at one side thereof and terminating therein near the bottom of the valve chamber, a longitudinally outwardly disposed central, longitudinally and radially inwardly inclined annular valve seat at the bottom of the chamber and communicating with the flow passage, and an outlet flow passage entering one side of the body and communicating with the valve chamber longitudinally outward of said seat, an elongate unitary fluid pressure actuated valve member molded of resilient plastic material having inner and outer ends and having an elongate externally threaded central portion freely engaged in the threaded valve chamber with sufficient radial clearance to permit limited radial expansion of said central portion, an elongate stem portion projecting longitudinally from the outer end of the central portion and from the outer end of the valve chamber, a resilient longitudinally and radially inwardly convergent plug portion projecting longitudinally inwardly from the inner end of the central portion and engageable through and into seated engagement with the seat and an elongate central, inwardly opening pressure chamber entering the inner end of the plug portion and terminating in the central portion and communicating with the inlet passage whereby fluid under pressure in the inlet flow passage enters the valve member, yieldingly expands the plug portion radially outward to urge the plug portion into sealing engagement with the seat and yieldingly expands the central portion radially outward to permit greater radial expansion of the plug portion to establish snug engagement in the chamber.

---

This invention relates to a valve and is more particularly concerned with a novel molded plastic plug valve construction.

The ordinary or conventional plug valve for use in connection with small diameter pipes, that is, pipes less than three inches in outside diameter, are established of brass and involve or include a cast brass body, a machined brass stem threadedly engaged in the body, a cast brass apertured bonnet, through which a portion of the stem projects, threadedly engaged on the body and enclosing a suitable packing a rubber sealing cone or disc at one end of the stem to engage a seat in the body and secured to the stem by means of a brass screw and a manually engageable operating handle at the other end of the stem secured thereto by means of a brass screw.

Brass bib-type plug valves such as referred to above are mass produced at very low cost. As a result, they are often considered expendable and the fact that they are wanting in any one of several respects for a particular use or installation is discounted, due to their low cost.

In situations where it is anticipated that such valves will fail for one reason or another, the general attitude of the art is to proceed with the use of these inexpensive units and figure to replace them when they fail.

One major shortcoming to be found in ordinary brass plug valve construction such as is referred to above resides in the fact that the metal is subject to being attacked or reduced by electrolytic action, with resulting failure.

While there are many situations where it is known that electrolytic action will or may be encountered and troublesome and oftentimes expensive efforts or steps can be made to overcome such action, there are many other situations where it is not expected. Further, the magnitude of such action and the part or parts of the valve constructions which it attacks is seldom determinable, with the result that the effective life of such valve constructions can seldom, if ever, be determined.

Another major shortcoming in brass plug valve constructions of the character referred to resides in the fact that the cast portions thereof are frequently replete with holes and cavities, as a result of impurities, and the like, in the metal. Such defects in the castings are seldom visible and frequently unexpectedly manifest their presence by ruptures, leaks, and the like, when the constructions are in use.

Still another shortcoming in brass plug valve constructions resides in the fact that the metal is malleable and has little resiliency or memory. As a result of the above, if these valves are subject to considerable pressures and accompanying water hammering, the metal is caused to stretch and flow, with resulting growth of the valve bodies to an extent that the various components no longer properly fit and/or are so weakened that they fail.

The same or similar results occur when brass valve constructions are subjected to repeated freezing and thawing.

Yet another shortcoming to be found in brass valve constructions of the character referred to resides in the fact that brass has a relatively high coefficient of friction with water and certain other fluids. As a result, plug valves of the character referred to create a substantial resistance to flow therethrough.

An object of this invention is to provide a novel plastic plug valve construction having a unitary plastic stem and valve member or plug.

Another object of our invention is to provide a novel valve construction of the character referred to wherein the valving member is chambered to communicate with the upstream or pressure side of the valve when the valve is closed, whereby the said valving member or plug is urged into sealing engagement with its related seat by fluid pressure when the valve is closed.

An object of the present invention is to provide a valve of the character referred to which is formed of a rigid yet resilient plastic material having a very low coefficient of friction with water, whereby greater flow is obtained than with ordinary brass or metal valve constructions.

Another object of this invention is to provide a sanitary valve formed of non-oxidizing and/or non-contaminating plastic material and a valve construction having a minimum number of separate parts to establish cracks, crevices and the like, in which foreign matter might lodge.

A further object of this invention is to provide a valve of a dielectric material and such that it will not create or be affected by electrolytic action.

The various objects and features of our invention will be fully understood from the following detailed description of typical preferred forms and applications of our invention, throughout which description reference is made to the accompanying drawings, in which:

FIG. 1 is an elevational view of a valve embodying the present invention;

FIG. 2 is a detailed sectional view of the construction that we provide;

FIG. 3 is a sectional view taken as indicated by line 3—3 on FIG. 1 of the drawings;

FIG. 4 is a sectional view taken as indicated by line 4—4 on FIG. 1 of the drawings;

FIG. 5 is an enlarged detailed sectional view of a portion of our new construction, showing the valve in its open position; and FIG. 6 is a view similar to FIG. 5, showing the valve in its closed position and actuated into sealing engagement by fluid pressure.

The present invention has to do with a small diameter plug valve construction. In the drawing and for the purpose of illustration, we have shown that type of plug valve commonly referred to as a "hose-bibb" or "hose faucet," and which finds wide use throughout the many arts where fluids are handled.

It is to be understood that in practice plug valves similar mechanically and hydraulically with "hose-bibbs" or "hose faucets" can be established in accordance with the present invention.

The hose-bibb or valve A illustrated in the drawings and embodying our invention involves, generally, a body B, a unitary stem and valving member M, a packing gland bonnet C, a back-up washer W, a packing P and an operating handle H.

In addition to the above noted parts, a suitable screw fastener F is shown provided for securing the handle H to the member M.

The body A is a unitary part molded of a suitable, rigid, yet resilient and flexible, plastic material such as Delrin, Teflon, nylon, or the like.

The body is such that it can be advantageously mass produced by conventional injection molding methods and apparatus.

The body A is shown as having a substantially vertically disposed central portion 10 with a central, cylindrical upwardly opening and internally threaded stem and valve member receiving chamber 11. The chamber 11 terminates at a flat, upwardly disposed bottom 12. The central portion 10 of the body is further provided with an elongate cylindrical flow passage 14 of reduced diameter, which passage is concentric with and continues downwardly from the bottom 12 of the chamber 11 and terminates at a flat bottom 15. In addition to the foregoing, the said portion 10 of the body is provided with an annular downwardly convergent valve seat 16 at or between the bottom 12 of the chamber and the upper end of the duct or passage 14, and concentric therewith.

The upper end of the central portion 10 of the body B is provided with an annular back-up washer receiving counterbore or recess 17, as clearly illustrated in the drawings. The upper end portion of the body portion 10 is externally threaded, as at 18, and is adapted to cooperatively receive the bonnet C, as will hereinafter be described.

The body B further includes inlet and outlet portions 19 and 20, formed integrally with the said central portion thereof and projecting substantially horizontally from the lower end portion of said central portion and from diametrically opposite sides thereof.

The inlet portion 19 is shown as being in the nature of an elongate, cylindrical boss projecting from the left-hand side of the central portion 10. The inlet portion 19 is provided with an internally threaded longitudinally outwardly opening socket 21 to cooperatively receive the threaded end of a supply pipe (not shown). The portion 19 of the body is further provided with a polygonal tool-engaging enlargement 22 at its outer terminal end portion to facilitate engagement and/or removal of the body from a supply pipe.

The socket 21 terminates at a flat bottom 23 adjacent that part or portion of the construction where the inlet portion 19 joins the central portion 10 of the body.

An inlet flow port 24 is provided in the body B to establish communication between the socket 21, at the bottom thereof and the flow passage 14, below the seat 16.

The outlet portion 20 of the body B is in the nature of an elongate, cylindrical boss projecting from the right-hand side of the central portion 10. The outlet portion 20 has a central longitudinally outwardly opening socket 25 terminating at a bottom wall 26, where portion 20 joins the central portion 10 of the body and is externally threaded as at 27, to cooperatively receive the female member of a hose coupling (not shown).

A suitable outlet flow port 28 is provided in the body between the chamber 11, above the seat 16, and the socket 25 at the bottom thereof.

In accordance with conventional hose-bibb or hose faucet construction, the central axis of the central body portion 10 is pitched or inclined upwardly and to the right, and the axis of the outlet portion 20 is pitched or inclined downwardly and to the right. Such relative pitching and/or inclination of the said portions of the body is for convenience only, and in no way effects the novelty of this invention.

The stem and plug or valve member M is an elongate unitary part molded of the same or similar plastic as the body B.

The member M has an elongate cylindrical, externally threaded central or screw portion 30 substantially less in longitudinal extent than and cooperatively engaged in the threaded chamber 11 in the body B, an elongate cylindrical upper portion or stem portion 31 of reduced diameter projecting outwardly from the central portion 30 and from within the chamber 11 and the upper end of the body portion 10, and a downwardly convergent or tapered sealing cone or plug portion 32 depending from the lower end of the central screw portion and adapted to establish seated engagement in or with the tapered seat 16 in the body.

In addition to the above, the member M is provided with an elongate central downwardly opening pressure chamber X, which chamber is coextensive with the plug portion 32 and continues upwardly into and through the central portion 30 of the member M, as clearly illustrated in the drawings.

It will be apparent that when the valve is closed the chamber X is in communication wtih the passage 14 and the pressure or upstream side of the valve and that the hydrostatic or fluid pressure acting on the walls of the chamber X tend to urge or expand the plug portion 32 radially outwardly and into pressure sealing engagement with the seat 16.

The major outside diameter of the central threaded portion 30 of the member M is slightly less than the major inside diameter of the chamber 11 and the minor outside diameter of the said central threaded portion 30 of the member M is less than the minor inside diameter of the chamber 11.

As a result of this relationship of parts, the central portion 30 of the member M is free to expand upon the application of fluid pressure from within the said member and upon the relief of external pressure on said member, as when the valve is closed. This ability of the central portion to expand is highly important as it permits the lower plug portion 32 to expand freely and, in addition, tends to draw the plug portion into an expanded or distended condition. That is, the central portion, being free to expand in the chamber 11, does not prevent but assists the lower plug portion to expand into engagement with the seat 16.

In addition to the above, the upper portion 31 of the member M is provided wtih flats 35 at its upper or free end portion and an internally threaded, fastener-receiving opening 36.

The bonnet C that we provide is a unitary molded plastic part established of the same or similar plastic from which the body and member M are established and has a lower annular collar portion 40 and an upper dome portion 41.

The collar portion 40 is internally threaded as at 42 and is polygonal in outside configuration, providing a plurality of tool-engaging flats about its exterior.

The collar portion of the bonnet is threadedly engaged on and about the upper threaded end portion of the central portion 10 of the body, as clearly illustrated in the drawings.

The upper dome portion of the bonnet is a simple shell-like portion having a central aperture 43 through which the upper stem portion of the member M freely projects. The dome portion defines a downwardly opening packing chamber Y.

The lower portion of the dome portion, where it meets or joins the collar portion, defines a downwardly disposed annular shoulder, which shoulder is spaced above and opposes the top or upper end of the central portion 10 of the body.

A suitable annular sleeve-like body of chevron packing P, or the like, is engaged in the chamber Y of the body and about an upper or stem portion 31 of the member M. The packing normally projects from the lower end of the chamber Y and into the confines of the collar portion 40 of the bonnet.

In addition to the foregoing, a suitable fiber sealing washer 51 is engaged about the upper or stem portion 31 of the member M, the central portion of which engages the lower end of the packing P and the outer peripheral portion of which occurs between the shoulder of the bonnet and the top of the central portion 10 of the body and seals therebetween when the bonnet is advanced and urged into tight engagement on the body. When the bonnet is thus engaged on the body, the washer 51 tends to compact the packing P into sealing engagement in the dome portion of the bonnet and about the stem or upper portion 31 of the member M.

The back-up washer W that we provide is a simple, molded or die-cut plastic washer and is slidably engaged about the upper or stem portion 31 of the member M to engage and support the lower side of the fiber sealing washer and to seat in the annular recess 17 in the upper end of the body B.

The washer W prevents the washer 51 from yielding and being displaced when the structure is made up tight and the packing P is compacted.

It is to be understood that the bonnet and packing gland construction set forth above and illustrated in the drawings is only illustrative of one form of carrying out of our invention and can be varied widely, as circumstances require.

The handle H is a simple molded plastic, manually engageable member having a central downwardly opening polygonal opening 60 to cooperatively receive and establish driving engagement with the upper terminal end portion of the stem portion and has a central upwardly opening fastener-receiving opening 61 communicating with the opening 60 and through which the screw fastener F, which fastener can be formed of plastic, is engaged.

The fastener F is engaged in the opening 36 in the member M and holds the handle H in fixed position on the said member M.

In practice, the handle can be of any suitable configuration and can, if desired, be replaced by other suitable operating means, without departing from the spirit of this invention.

It will be apparent that when the valve is shifted from its closed position, where it has been caused to expand by fluid pressure in the chamber X, the pressure differential between the inside of the member, that is, in the chamber X, and the exterior of the member is neutralized and the member is free to return to its normal position or condition, as a result of the inherent resiliency and/or memory of the plastic material from which the valve is made.

Since the plug portion 32 of the valve member returns to its normal configuration or condition upon opening of the valve, that is, it contracts, it is such that upon reclosing of the valve structure, it initially freely and fully enters and establishes seated sealing engagement on or with the seat 16 in the body. It is not until such seated sealing engagement is established that the full potential pressure differential, which causes expansion of the plug member, is reestablished.

It will be further apparent that the chamber X traps a volume of air and acts or serves as an accumulator. Should the water in the valve freeze, it is free to expand or grow upwardly into the chamber X and to compress the air therein, thereby materially reducing or eliminating the possibility the valve structure itself will be excessively distended by the formation of ice.

It will be apparent that with the valve construction that we provide, the valve need not be jammed closed by the exertion of excessive forces to establish a full shut-off. On the contrary, the construction is such that it need only be operated so as to shift the plug portion 32 into substantial uniform and seated contact or engagement on the seat 16, whereupon the effect of the pressure differential comes into play and the plug is expanded into sealing engagement with the seat and completes the desired shut-off.

Having described only a typical preferred form and application of our invention, we do not wish to be limited or restricted to the specific details herein set forth, but wish to reserve to ourselves any modifications and/or variations that may appear to those skilled in the art and which fall within the scope of the following claims.

Having described our invention, we claim:

1. A valve of the character referred to including, an elongate body with inner and outer ends, an elongate internally threaded valve chamber entering the outer end of the body and terminating at a bottom therein, a lateral inlet flow passage entering the body at one side thereof and terminating therein near the bottom of the valve chamber, a longitudinally outwardly disposed central, longitudinally and radially inwardly inclined, annular valve seat at the bottom of the chamber and communicating with the flow passage, and an outlet flow passage entering one side of the body and communicating with the valve chamber longitudinally outward of said seat, an elongate unitary valve member molded of resilient plastic material having inner and outer ends and having an elongate, externally threaded central portion freely engaged in the threaded valve chamber with sufficient radial clearance to permit limited radial expansion of said central portion, an elongate stem portion projecting longitudinally from the outer end of the central portion and from the outer end of the valve chamber, a resilient, longitudinally and radially inwardly convergent plug portion projecting longitudinally inwardly from the inner end of the central portion and engageable through and into seated engagement with the seat and an elongate central inwardly opening pressure chamber entering the inner end of the plug portion and terminating in the central portion and communicating with the inlet passage whereby fluid under pressure in the inlet flow passage enters the valve member, yieldingly expands the plug portion radially outward to urge the plug portion into sealing engagement with the seat and yieldingly expands the central portion radially outward to permit greater radial expansion of the plug portion and to establish snug engagement in the chamber.

2. A valve of the character referred to including an elongated body with inner and outer ends, an elongate internally threaded valve chamber entering the outer end of the body and terminating at a bottom therein, an inlet flow passage entering the body at one side thereof and terminating near the bottom of the valve chamber, a longitudinally and radially inwardly convergent annular valve seat continuing longitudinally inwardly from the bottom of the chamber and communicating with the inlet flow passage, and an outlet flow passage entering one side of the body and communicating with the valve chamber longitudinally outwardly from the seat, an elongate unitary valve member having inner and outer ends and molded of a resilient plastic material, said member having an elongate externally threaded central portion engaged in the chamber with sufficient radial clearance to permit limited radial expansion of said central portion, an elongate stem portion projecting longitudinally from the outer end of the central portion and from the open outer end of the chamber, an elongate longitudinally and radially inwardly convergent resilient plug portion greater in longitudinal and major diametric extent and less in minor diametric extent than the seat and projecting from the inner end of the central portion and engageable through and into seated engagement in the seat and an elongate central longitudinally inwardly opening pressure chamber entering the plug portion and extending through the central portion and communicating with the inlet flow passage when the valve is closed, whereby fluid under pressure in the inlet flow passage enters the valving member to expand the central and plug portions of the member radially and urge the plug portion thereof radially outwardly into sealing engagement with the seat.

3. A structure as set forth in claim 2 wherein the major and minor outside diameters of the central threaded portion of the valve member are less than the major and minor inside diameters of the threaded chamber and wherein said pressure chamber continues longitudinally of the valving member into the central portion thereof, whereby the central portion of the valving member is free to expand radially outwardly in the chamber to allow the upper portion of the plug portion to freely expand radially outwardly when the valve is closed and fluid under pressure enters the pressure chamber.

4. A structure as set forth in claim 2 including a packing gland engaged with the outer end of the body and about the stem portion of the valving member and a manually engageable operating handle fixed to the outer free end of the said stem portion.

5. A structure as set forth in claim 2 wherein said body is established of a plastic material, is externally threaded at its outer end and is provided with laterally outwardly projecting threaded bosses through which said flow passages extend, and packing means to seal between the stem and the stem portion of the valving member and the body and including, a back-up washer engaged about the stem portion and against the outer end of the body, an apertured bonnet threaded on the body and through which the stem portion projects and defining a longitudinally inwardly opening annular cavity about the stem and opposing the washer, and annular body of packing material in said cavity and about the stem and engaging said washer, and an operating knob fixed to the outer free end of the stem portions.

References Cited

UNITED STATES PATENTS

| | | | |
|---|---|---|---|
| 254,130 | 2/1882 | Harrison | 251—333 |
| 1,392,547 | 10/1921 | Willis | 251—215 X |
| 2,478,350 | 8/1949 | Wirz | 251—214 |
| 2,596,681 | 5/1952 | Hammon | 251—214 |
| 2,911,185 | 11/1959 | Langdon | 251—175 |
| 2,991,972 | 7/1961 | Busby | 251—175 |
| 3,265,353 | 8/1966 | Varga | 251—175 |

FOREIGN PATENTS

| | | |
|---|---|---|
| 11,694 | 1895 | Great Britain. |
| 888,143 | 1/1962 | Great Britain. |

WILLIAM F. O'DEA, *Primary Examiner.*

H. W. WEAKLEY, *Assistant Examiner.*